United States Patent
Kimura

(10) Patent No.: US 7,681,058 B2
(45) Date of Patent: Mar. 16, 2010

(54) INFORMATION PROCESSING APPARATUS AND POWER SUPPLY CONTROL METHOD

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 11/017,950

(22) Filed: Dec. 22, 2004

(65) Prior Publication Data

US 2006/0059380 A1    Mar. 16, 2006

(30) Foreign Application Priority Data

Sep. 10, 2004   (JP) .............................. 2004-264623

(51) Int. Cl.
   G06F 1/26   (2006.01)
   G06F 1/28   (2006.01)
   G06F 1/30   (2006.01)
   G06F 1/32   (2006.01)

(52) U.S. Cl. ................ 713/323; 713/1; 713/2; 713/100; 713/300; 713/310; 713/320; 713/321; 713/322; 713/324; 713/330; 713/340

(58) Field of Classification Search ............ 713/1, 713/2, 100, 300, 310, 320–324, 330, 340
   See application file for complete search history.

(56) References Cited

U.S. PATENT DOCUMENTS

| 5,600,840 | A * | 2/1997 | Pearce et al. ............... 713/323 |
| 5,696,897 | A | 12/1997 | Dong |
| 5,978,922 | A * | 11/1999 | Arai et al. .................. 713/323 |
| 6,154,846 | A * | 11/2000 | Arai ........................... 713/323 |
| 6,295,577 | B1 * | 9/2001 | Anderson et al. ........... 711/113 |
| 6,389,556 | B1 * | 5/2002 | Qureshi ....................... 714/15 |
| 6,996,746 | B2 * | 2/2006 | Shukla et al. ................ 714/24 |
| 2002/0156983 | A1 * | 10/2002 | Jones et al. ................. 711/143 |
| 2003/0051114 | A1 * | 3/2003 | Natu .......................... 711/165 |
| 2003/0131206 | A1 * | 7/2003 | Atkinson et al. ............ 711/156 |
| 2004/0054941 | A1 * | 3/2004 | Seiler et al. ................ 713/324 |
| 2004/0123057 | A1 | 6/2004 | Freudenschuss et al. |
| 2004/0199757 | A1 * | 10/2004 | Hashimoto et al. ............. 713/1 |
| 2004/0215983 | A1 * | 10/2004 | Kwahk et al. ............... 713/300 |
| 2005/0055591 | A1 * | 3/2005 | Cho ........................... 713/320 |

FOREIGN PATENT DOCUMENTS

DE       1 435 559 A2    7/2004

(Continued)

OTHER PUBLICATIONS

Japanese Patent Office Action, mailed Sep. 2, 2008 and issued in corresponding Japanese Patent Application No. 2004-264623.

(Continued)

*Primary Examiner*—Chun Cao
*Assistant Examiner*—Fahmida Rahman
(74) *Attorney, Agent, or Firm*—Staas & Halsey LLP

(57) ABSTRACT

In standby mode, memory contents are saved to a hard disk. After AC power has been removed by disconnecting the AC plug, when the AC power is restored the data saved on the hard disk is automatically restored into memory to set the power-saving mode back to the standby mode. When the power is turned on next, quick resumption from standby mode can be accomplished.

4 Claims, 3 Drawing Sheets

FOREIGN PATENT DOCUMENTS

| | | |
|---|---|---|
| EP | 1 229 430 A1 | 8/2002 |
| JP | 7-219665 | 8/1995 |
| JP | 9-237128 | 9/1997 |
| JP | 10-097353 | 4/1998 |
| JP | 10-207588 | 8/1998 |
| JP | 2000-20182 | 1/2000 |
| JP | 2002-099502 | 4/2002 |
| JP | 2002-207539 | 7/2002 |
| JP | 2004-152304 | 5/2004 |

OTHER PUBLICATIONS

Japanese Office Action mailed Aug. 4, 2009 and issued in corresponding Japanese Patent Application 2004-264623.
German Office Action issued in German Application 102005001451.8, dated Mar. 23, 2006.

* cited by examiner

INFORMATION PROCESSING APPARATUS AND POWER SUPPLY CONTROL METHOD

BACKGROUND OF THE INVENTION

1. Field of the Invention

The present invention relates to an information processing apparatus and a power supply control method. More particularly, it relates to an information processing apparatus and a power supply control method in which provisions are made to reduce the time required to resume from a power-saving mode.

2. Description of the Related Art

In recent years, with improvements in CPU performance, coupled with increased hard disk capacity, PC/TV combinations which allow users to enjoy television programs and video recordings on personal computers (PCs) have been finding widespread use in homes. As PC/TV combinations have become widespread, the slow startup time of PCs, compared to the startup time of TVs, has become important. To improve the startup time of PCs and achieve power saving at the same time, power management standards (such as ACPI: Advanced Configuration and Power Interface) have been defined. ACPI S3 defines a "standby" mode, that is, a "suspend-to-RAM" mode. In standby mode when power is turned off, graphics functions and devices including hard disks are shut down, but power is supplied to the memory so that any work data is preserved. As the work data is preserved in the memory, it takes only a few seconds to resume from standby mode. Further, work can be resumed where it was left off.

ACPI S4 defines a "hibernation" mode, that is, a "suspend-to-disk" mode. In hibernation mode, after saving memory contents to a hard disk, all devices including the memory are shut down. When power is turned on again, the contents saved on the hard disk are written into the memory to resume. Hibernation mode can save more power than standby mode, but when the resume speed is compared, between hibernation and standby, it is much quicker to resume from the standby state in which the memory contents are preserved.

Here, when a comparison is made between resumption from standby mode and resumption from hibernation mode, the execution of the BIOS (Basic Input/Output System) takes about 0.5 second after power on from standby mode and 7 to 10 seconds from hibernation. After that, it takes 2 to 5 seconds to load the OS (Operating System) in the case of standby mode and 13 to 20 seconds in the case of hibernation mode. That is, it takes about 5 seconds to complete the loading of the OS after power on from standby mode and about 20 to 30 seconds after power on from hibernation. ACPI S5 defines a normal power-off mode, and it takes much longer to resume, that is, about 60 seconds, because a reboot is needed.

A personal computer equipped with a television function is usually used by connecting it to a commercial power line in a home; accordingly, unlike notebook computers, there is no concern of losing memory contents due to battery exhaustion. It is therefore desirable that the computer be placed in standby mode when shutting it off, if it is desired to quickly restart when power is turned on next. However, the problem is that, if the power supply is cut off during standby mode because of the disconnection of the AC plug or the occurrence of a power outage, the data stored in the memory will be lost. In particular, when the personal computer is used in the same way as a television set in a home, there are cases where the AC plug is disconnected upon power off for the purpose of power saving. If this happens when the computer is in a standby state, the work data saved in the memory will be lost.

A similar situation can happen in the case of a battery-operated personal computer; that is, if the battery runs down during standby mode, the data saved in the memory will be lost. Therefore, when safety is considered, using only the standby mode for power saving involves a problem. On the other hand, hibernation mode has the problem of slower startup time.

Traditionally, it has been known that a notebook computer or the like equipped with a resume function to resume from hibernation mode has the problem that it takes time to resume from hibernation mode. To solve this problem, there has been proposed a computer system in which when AC power supply is available, memory contents are saved on a hard disk upon turning off of the power switch, but power is continued to be supplied to the memory and, when the power switch is turned on next, the system is restored to the operating state from the hibernation state (Japanese Unexamined Patent Publication No. 10-97353). In the proposed system, a standby function is incorporated in a personal computer having the function of resuming from hibernation, and the system quickly resumes from standby mode when the power supply is on, but resumes from hibernation mode when the power supply is interrupted.

SUMMARY OF THE INVENTION

An object of the present invention is to provide an information processing apparatus that preserves data safely and that quickly resumes when power is turned on.

According to a first aspect of the present invention, there is provided an information processing apparatus which preserves programs and data during a power-off state by supplying power to a volatile storage device, comprising: a power detecting unit which detects an input of power; and a volatile storage restoring section which, when an input of power is detected by the power detecting unit, writes the programs and data, stored in a nonvolatile storage device, into the volatile storage device.

The information processing apparatus may further comprise a volatile storage recording unit which saves the programs and data stored in the volatile storage device to the nonvolatile storage device when making a transition to the power-off state.

The programs are an operating system and application programs and, when making the transition to the power-off state, the operating system can issue an instruction to all the application programs in execution to save work data.

The transition to the power-off state can be initiated by a user-performed standby operation.

The nonvolatile storage device may be a hard disk.

According to a second aspect of the present invention, there is provided a program for a computer which preserves execution programs and data during a power-off state by supplying power to a volatile storage device, wherein the program causes the computer to execute a volatile storage restoring procedure in which the execution programs and data stored in a nonvolatile storage device are written into the volatile storage device when an input of power is detected by a power detecting section.

Provisions may also be made to cause the computer to execute a volatile storage recording procedure in which the execution programs and data stored in the volatile storage device are saved to the nonvolatile storage device when making a transition to the power-off state.

The execution programs are an operating system for the computer and application programs executed on the operating system, and the program for the computer is stored in a BIOS and executed by the computer outside the management by the operating system.

According to a third aspect of the present invention, there is provided a computer readable recording medium having a program recorded thereon for a computer which preserves execution programs and data during a power-off state by supplying power to a volatile storage device, wherein the program causes the computer to execute a volatile storage restoring procedure in which the execution programs and data stored in a nonvolatile storage device are written into the volatile storage device when an input of power is detected by a power detecting section.

According to a fourth aspect of the present invention, there is provided a power supply control method which preserves programs and data during a power-off state by supplying power to a volatile storage device, comprising: detecting an input of power; and writing the programs and data, stored in a nonvolatile storage device, into the volatile storage device when an input of power is detected.

As described above, according to the present invention, as the programs and data stored in the nonvolatile storage device is written into the volatile storage device when an input of power is detected, the time required to resume when power is turned on next can be reduced.

DETAILED DESCRIPTION OF THE PREFERRED EMBODIMENT

Figure 1:
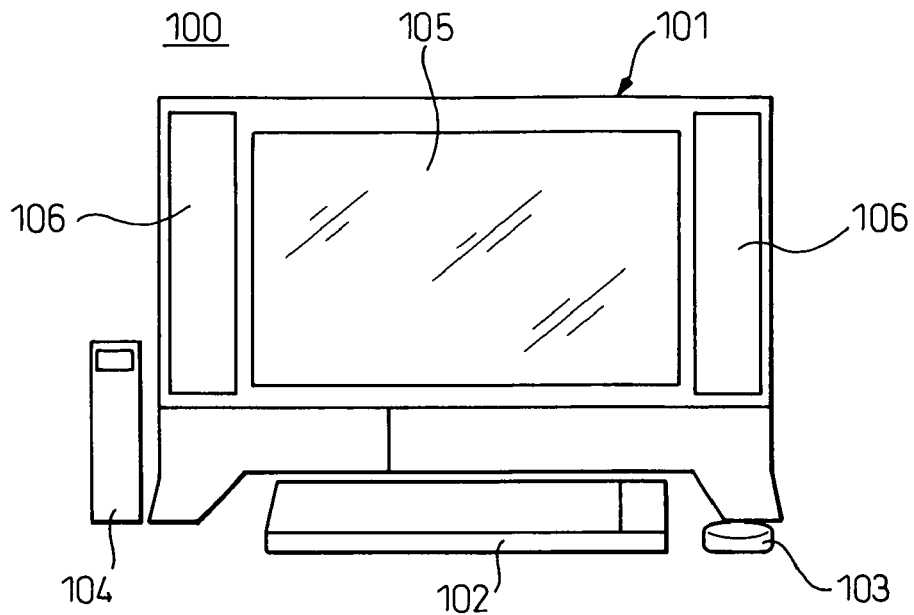
FIG. 1 is a diagram showing an information processing apparatus which implements one embodiment of the present invention.

One embodiment of the present invention will be described below with reference to the drawings. FIG. 1 shows one example of an information processing apparatus for carrying out the present invention. A computer 100 shown in FIG. 1 is a personal computer combined with a television and is used, for example, in a home, and its main unit 101 includes a liquid crystal display 105 and a speaker 106 on each side thereof. A keyboard 102 and a mouse 103 are attached as input devices. The keyboard 102 and the mouse 103 are each connected to the main unit 101 via a wireless link. A remote controller 104 is also provided. The remote controller 104 can be used to turn power on and off to the computer, change TV channels, start up computer applications, and so on. The main unit 101 contains a large-capacity hard disk, and a DVD (Digital Versatile Disc) drive is mounted in an openable fashion behind the front panel of the main unit. As the personal computer 100 has a built-in television function, received programs can be recorded on the hard disk, and the programs recorded on the hard disk can be recorded on DVDs. Further, any program received using the television function can be recorded directly on a DVD. Other than the keyboard 102 and the mouse 103, such input devices as a pen, a voice input device, etc. can be used. A printer and other output devices can be also attached. Further, other storage devices such as magnetic, optical, or semiconductor devices can be attached for storage of desired information. The computer 100 further incorporates a communication function so that it can connect to a LAN, the Internet, etc. via a wired or wireless means.

When the user who is performing work or watching TV on the computer desires to turn off the computer, the user has power off buttons displayed in pop-up fashion on the liquid crystal display, and selects the desired power-off mode from among standby mode (S3), hibernation mode (S4), normal power-off mode (S5), etc. The present invention concerns the control performed when shutting off the personal computer.

Figure 2:
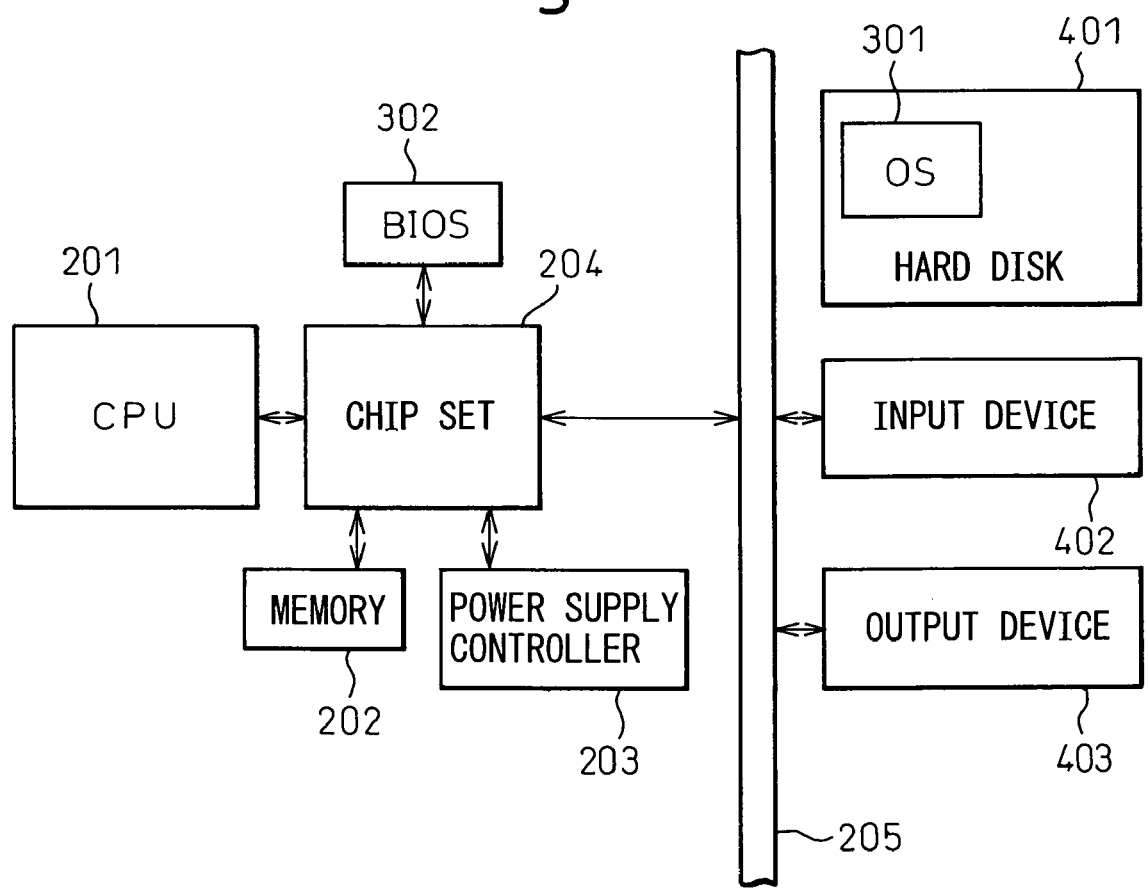
FIG. 2 is a diagram schematically showing the configuration of the information processing apparatus implementing the one embodiment of the present invention.

FIG. 2 schematically shows the configuration of the information processing apparatus implementing one embodiment of the present invention.

A CPU 201 is a central processing unit which controls the entire operation of the computer 100.

A memory 202 is a storage device for temporarily storing programs that the CPU 201 executes and data that refers to the CPU 201. The memory 202 is a volatile memory which retains the recorded contents as long as power is supplied to the memory, but the recorded contents are lost when power to the memory is removed.

A power supply controller 203 controls a power control unit which supplies power to the computer 100 as a whole. Supply of AC power to the power supply unit is detected.

A chip set 204 collectively controls the input/output control operations of the CPU 201.

A bus 205 connects the chip set 204 with various input/output devices.

An operating system 301 is the basic program that is stored on a hard disk and is loaded into the memory 202 for execution by the CPU 201. The present embodiment uses Windows XP (trade mark).

A BIOS 302 is a set of control programs stored in a nonvolatile memory such as a flash ROM and executed by the CPU 201.

A hard disk 401 is a nonvolatile storage device which stores the operating system 301 and application programs to be executed on the operating system 301.

An input device 402 is a device used to input data or commands into the computer 100, and includes the keyboard 102, the mouse 103, and the remote controller 104.

An output device 403 is a device to which data is output from the computer 100, and includes the liquid crystal display 105 and the speakers 106.

Figure 3:
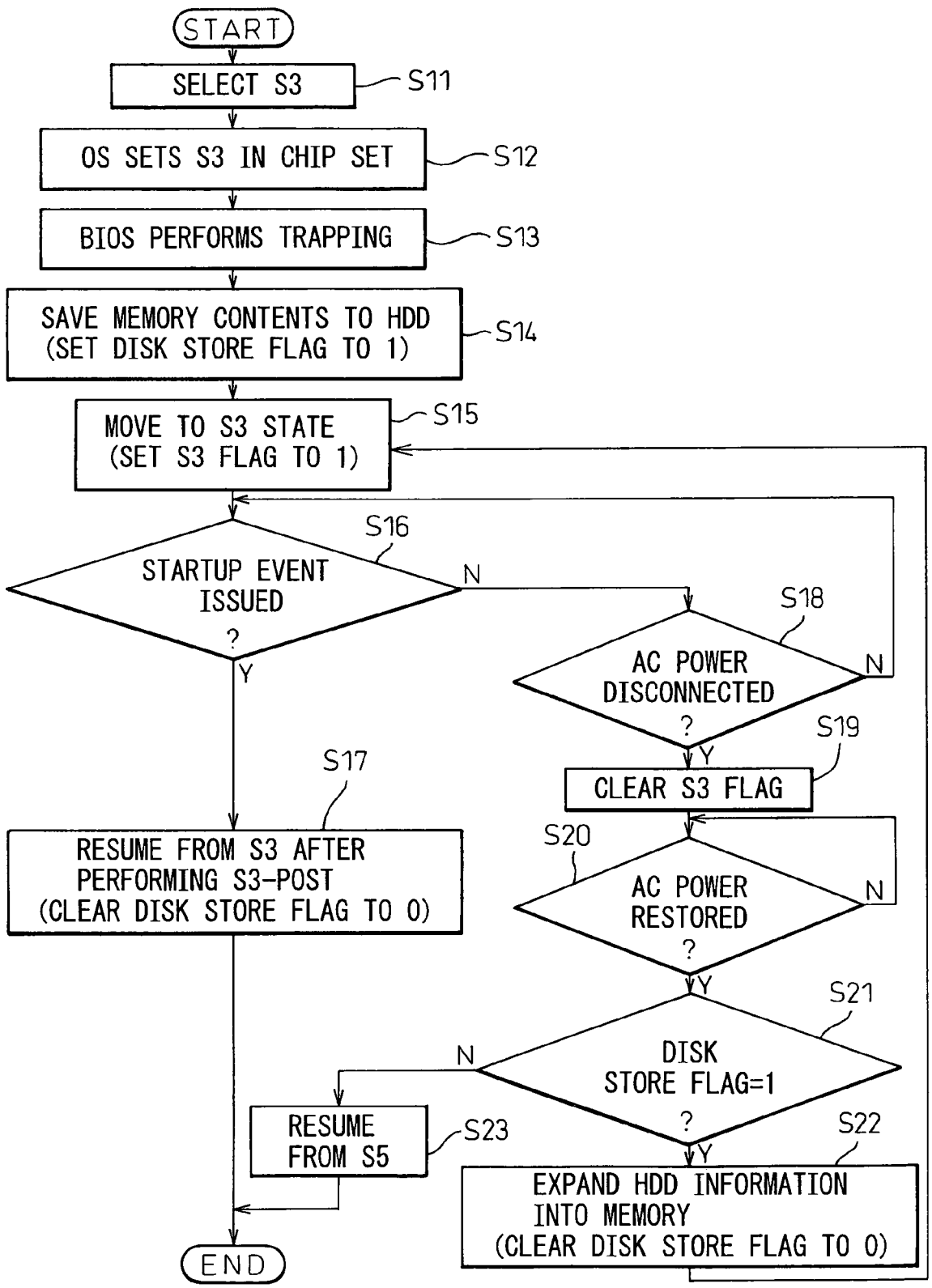
FIG. 3 is a diagram showing an operation flow according to one embodiment of the present invention.

FIG. 3 is an operation flow according to a first embodiment of the present invention, illustrating an example in which the present invention is applied to standby power-off mode. To turn off power to enter the standby mode, in step S11, a standby switch displayed on the screen is pressed. That is, ACPI standby mode (S3) is selected.

Here, though not described in the illustrated flow, provisions may be made to cause the operating system 301 to issue an instruction to each application program in execution to save work data. In response to the instruction, the application program can determine whether to save or not save the current work data. Standby power off has the feature that the work data is preserved as-is so that the work can be resumed when power is turned on next, but in view of the serious effect that could arise when the contents of the memory 202 were lost due to power failure, it is desirable to close all application programs in execution after saving their work data. This also serves to avoid possible trouble of the operation system 301 due to a memory leak. In particular, in the case of the computer 100 combined with a television set, since the computer tends to be handled in the same way as an ordinary home electric appliance, it is recommended that extra precautions be taken against losing or destroying data. In an environment where a television viewing program, a DVD playback program, and other application programs can be directly started up by using the remote controller 104, no particular inconvenience will be caused if these application programs are closed before going into the standby mode; rather, such precautions are extremely useful when reliability is considered.

In step S12, the operating system 301 of the computer 100 sets standby mode in the chip set 204. In step S13, when the operating system 301 effects the transition to the standby mode, the BIOS 302 traps an I/O port or a memory address. In the prior art, in the ACPI environment, the operating system 301 controlled standby mode, hibernation mode, etc. by directly controlling the hardware such as the power supply controller 203. In the APM (Advanced Power Management) environment, the operating system 301 or a power management driver sets the power state and calls the BIOS 302. Accordingly, in the ACPI/APM environment, a transition was simply made to the power state determined by the operating system 301, and resume time and data safety were determined by the depth of the power state thus determined. In the present invention, on the other hand, as the processing is performed by the BIOS 302 outside the management of the operating system 301, the process is free from constraints imposed by the operating system 301.

Next, in step S14, the contents of the memory 202 is saved to the hard disk 401 directly by the BIOS 302, or by using a utility program. At the same time, a disk store flag is set to 1. The disk store flag is stored in a nonvolatile memory, and is therefore retained after power is turned off. After saving the contents of the memory 202 to the hard disk 401, a transition is made in step S15 to the standby mode. That is, power is supplied only to the memory 202 which thus preserves its stored data.

It is detected if a startup event is issued when in the standby mode in step S16. The startup event occurs when the user presses the power on button or when power is turned on by a timer or, if the personal computer is connected to a network, when a wakeup event is received over the network. In step S17, by detecting the startup event, prescribed processing is performed to resume from standby. When resuming from standby mode in step S17, the S3 flag is checked to verify that the flag is 1, and S3-POST is performed to diagnose the states of the CPU 201, memory 202, disk controller, graphics controller, serial/parallel ports, keyboard controller, and other devices on the motherboard. In this case, as the S3 flag is 1, if there are no errors, resumption from standby is mode done. The disk store flag is cleared. It takes about 5 seconds to resume from standby mode, which is about the same time taken to start up the television; therefore, the user does not notice a problem.

While waiting for the occurrence of a startup event in step S16, there can occur cases where the AC power supply is disconnected, for example, due to the disconnection of the AC power plug or the occurrence of a power outage. In step S18, the AC power supply is monitored for such power interruption. As long as an interruption in the AC power supply is not detected, the process returns to step S16 to wait for the occurrence of a startup event. If the AC power supply is interrupted by disconnecting the AC power plug or due to a power outage, the memory contents preserved by the supplied power are lost, and the S3 flag indicating the standby mode is cleared; in this case, the process waits in step S20 until the AC power is restored. In the present embodiment, however, even in the standby mode, the memory contents are saved on the hard disk (step S14), and the memory contents stored on the hard disk are effectively used as will be described later.

In this condition, when the AC power is turned on again or restored, the power supply controller 203 detects the restoration of the AC power (step S20), whereupon the process proceeds to step S21 where DC power is supplied to the computer 100, and it is checked whether the disk store flag is 1 or not. When the disk store flag is 1, that is, when the memory contents are saved on the hard disk 401, the process proceeds to step S22. In step S22, the data saved on the hard disk 401 is restored into the memory, and the disk store flag is cleared, after which the process returns to step S15. In step S15, a transition is made to the standby mode, and the S3 flag is set back to 1. In this way, when the AC power supply is interrupted, and the standby mode is cleared, if the power supply is thereafter restored by reconnecting the AC plug or recovering from the outage, the memory contents saved on the hard disk 401 are automatically restored into the memory, and the mode is set back to the standby mode; as a result, when power is turned on next, quick resumption from standby can be accomplished. If, in step S21, the disk store flag is not 1, for example, because saving to the hard disk 401 has not been completed successfully, then the system resumes from the S5 state, that is, the power-on state is restored by rebooting the system.

The reason that the disk store flag is cleared to 0 in step S22 is that, if the disk store flag were left at 1, the process would enter an endless loop, and might not be able to exit from the endless loop should the data stored on the hard disk 401 be corrupted. In the present embodiment, the transition to the standby mode is executed by the BIOS 302 in a manner invisible to the user by shutting off the display screen. Accordingly, provisions must be made by considering such cases where the user disconnects the AC power plug during the transition to the standby mode. However, since the disk store flag is cleared to 0 in step S22, if the AC power is thereafter turned off again, the system will resume from the S5 state (step S21). In view of this, it is desirable to close all application programs in execution before moving to the standby mode.

The above description has been given by assuming the ACPI environment, but it will be recognized that the present invention can also be applied to an information processing apparatus employing a power management mechanism, such as APM, that calls a BIOS function, rather than the operating system 301 directly controlling the hardware, when placing the information apparatus in a power-saving mode. In this case, when standby is invoked by the operating system 301 or the power management driver, transition to the standby mode should be performed after saving memory information to the hard disk 401 by the BIOS 302.

Figure 4:
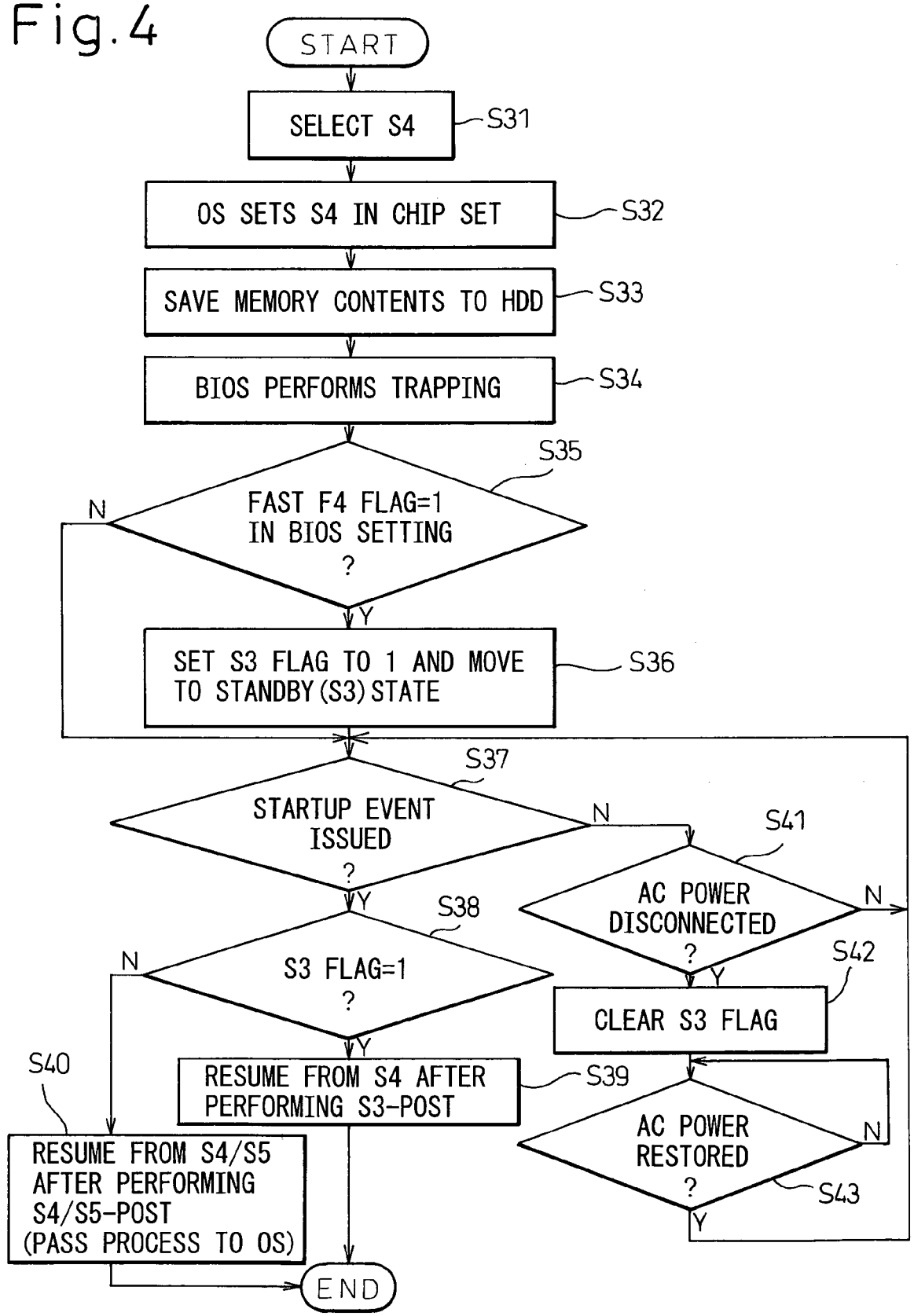
FIG. 4 is a diagram showing an operation flow according to another embodiment of the present invention.

FIG. 4 is a flow illustrating the operation according to a second embodiment of the present invention. This embodiment aims to speed up the time required to resume from hibernation (S4) when the power was turned off by selecting the hibernation mode. In the present embodiment, the BIOS 302 can be set to select the hibernation state between normal S4 or fast S4 which takes shorter time to resume than normal S4.

First, in step S31, as in the first embodiment, a hibernation state select button is displayed on the display screen when turning off the power. It is assumed here that fast S4 is selected as the hibernation state. When the hibernation state is selected, the operating system 301 sets the hibernation state in the chip set 204 in step S32, and the memory contents are saved to the hard disk 401 in step S33.

When the operating system 301 completes the processing, in step S34, the BIOS 302 performs trapping. In step S35, it is checked whether a fast S4 flag indicating the fast S4 state is 1 or not; if the fast S4 flag is 1, the process proceeds to step S36 where the S3 flag is set to 1 by the BIOS 204 to enter the standby mode. That is, after the power off is effected, power continues to be supplied only to the memory 202 which thus preserves its stored data. Here, as the processing performed by the operating system 301 was for the hibernation state, the contents of the memory 202 are already saved to the hard disk 401 (see step S33).

Then, in step S37, the process waits for a startup event to be caused by the user or the timer or to be received over the network; when the occurrence of a startup event is detected, it is checked in step S38 whether the S3 flag is 1 or not and, if the S3 flag is 1, S3-POST is executed in step S39 to resume from the S4 state. Here, as the computer has been put in the standby mode in step S36, the information on the peripheral devices, that the BIOS checks, is stored in the memory. The operating system 301 can be recalled instantly, as the internal processing of the BIOS is in the standby state. As the S4 state is set in the chip set 204, the operating system 301 restored the data from the hard disk 401 into the memory 202 to accomplish resumption from the hibernation state. In this way, the computer can be restored to the power-on state in a shorter time than when restoring the system state from hibernation. As previously noted, when resuming from hibernation, the execution of the BIOS 204 would take about 7 to 10 seconds, followed by the loading of the operating system 301 which would take 13 to 20 seconds. In the present embodiment, the execution of the BIOS 204 takes only 0.5 second, since its processing is started from the standby state.

If it is determined in step S38 that the S3 flag is not 1, the process proceeds to step S40 where the process is passed to the operating system 301 and, after performing the necessary POST, processing is performed to resume from the normal hibernation state or the power-off state.

As the present embodiment assumes the use of hibernation, there is no concern of losing data due to AC power disconnection, unlike the case of standby.

If the AC plug is disconnected or a power outage occurs before the occurrence of a startup event (step S37), that is, if the AC power supply is disconnected in step S41, power to the memory is cut off, so that the data in the memory 202 is lost and the standby (S3) flag is cleared to 0 (step S42). From this AC power completely-off condition, if the AC power is restored, the AC power-on condition is detected in step S42. When the restoration of the power is detected in step S43, the process returns to step S37 where the process waits for the occurrence of a startup event. In this case, as the S3 flag is 0, fastes S4 is disabled.

In the present embodiment also, it will be recognized that the invention can also be applied to an information processing apparatus employing a power management mechanism, such as APM, that calls a BIOS function, rather than the OS directly controlling the hardware, when placing the information apparatus in a power-saving mode. In this case, after hibernation is invoked by the operating system 301 or the power management driver, and the memory information is saved to the hard disk 401, the transition to the standby mode should be effected by the BIOS 302.

The first and second embodiments both speed up startup times while ensuring data safety, and thus enhance user convenience. When the user selects standby, control is preformed so that the computer resumes from the standby state whenever possible, and when the user selects hibernation, control is preformed so that the computer resumes from the hibernation state whenever possible.

Each of the embodiments has been described by taking as an example a personal computer equipped with a television function, but it is obvious that the present invention can also be applied to ordinary desktop personal computers; furthermore, the present invention can be applied to battery-operated laptop, notebook, or palmtop computers.

While the above embodiments have been described as using a hard disk as the nonvolatile storage device, other suitable nonvolatile storage device, for example, a flash memory, may be used as the storage device.

What is claimed is:

1. A power supply control method for an information processing apparatus, comprising:
    saving information stored in a volatile storage unit into a nonvolatile storage unit, when said information processing apparatus enters a hibernation state;
    stopping an operating system working in said information processing apparatus;
    setting first information indicating that said information processing apparatus is in a standby state through a process executed independently of said operating system;
    setting said information processing apparatus in the standby state after setting said first information through said process executed independently of said operating system, to hold information on a peripheral device in said volatile storage unit;
    checking whether or not said first information exists when said information processing apparatus is activated;
    calling said operating system after checking the information on the peripheral device in said volatile storage unit and restoring said information saved in the nonvolatile storage unit into the volatile storage unit through said operating system, if said first information exists;
    entering said information processing apparatus into a turn-on state; and,
    entering said information processing apparatus from the hibernation state into the turn-on state, if said first information does not exist.

2. The power supply control method as claimed in claim 1, wherein said nonvolatile storage unit is a hard disk.

3. An information processing apparatus, comprising:
    a volatile storage unit storing information to use for said processing;
    a nonvolatile storage unit storing information;
    a power control unit controlling and detecting power supply into said information processing apparatus; and
    a processing unit processing information stored in said volatile storage unit;
    said processing unit further comprising,
        means for saving information stored in the volatile storage unit into the nonvolatile storage unit, when said information processing apparatus enters a hibernation state;
        means for setting first information indicating that said information processing apparatus is in a standby state through a process executed independently of an operating system,
        means for setting said information processing apparatus in the standby state after setting said first information through said process executed independently of said operating system, to hold information on a peripheral device in said volatile storage unit;
        means for checking whether or not said first information exists when said information processing apparatus is activated, and further calling said operating system after checking the information on the peripheral device in said volatile storage unit and restoring said information saved in the nonvolatile storage unit into the volatile storage unit through said operating system, if said first information exists;

means for entering said information processing apparatus into a turn-on state; and, means for entering said information processing apparatus from the hibernation state into the turn-on state, if said first information does not exist.

4. The information processing apparatus as claimed in claim 3, wherein said nonvolatile storage unit is a hard disk.

* * * * *